(No Model.) 2 Sheets—Sheet 2.
C. R. DAELLENBACH.
INDICATING ALARM FOR ROUNDABOUTS.
No. 547,143. Patented Oct. 1, 1895.
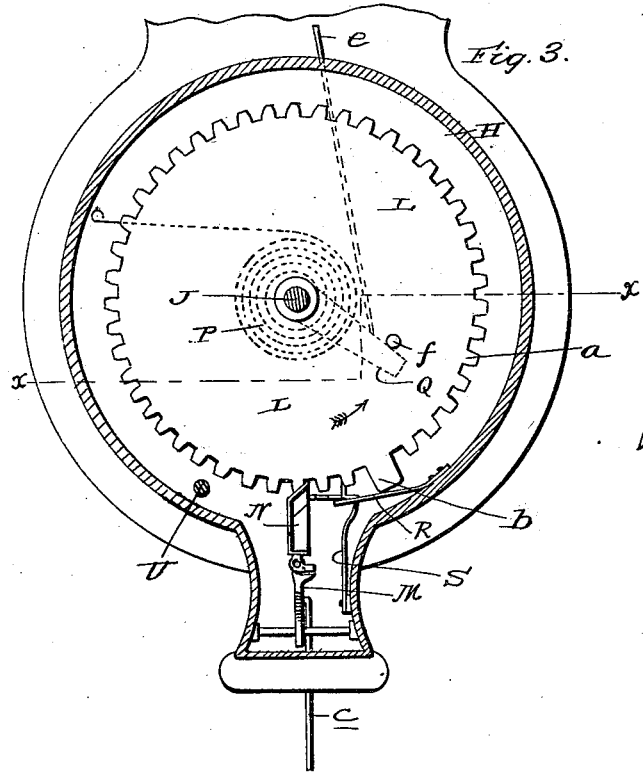
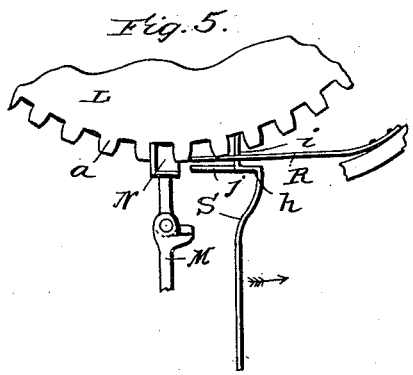
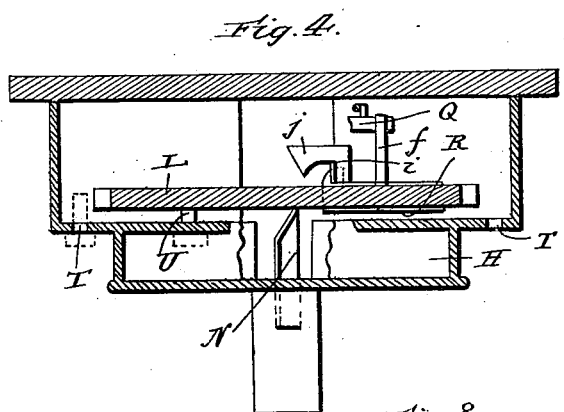
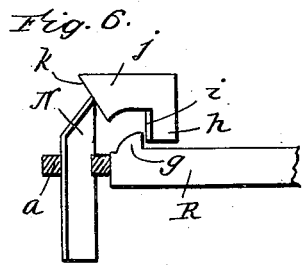
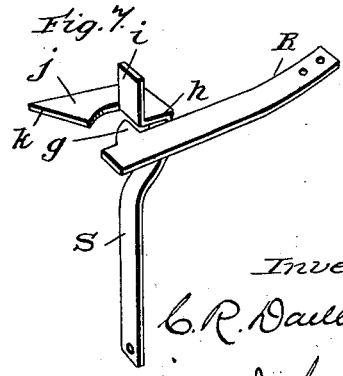
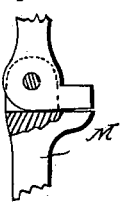
Witnesses:
Inventor
C. R. Daellenbach
By James J. Sheehy
Attorney

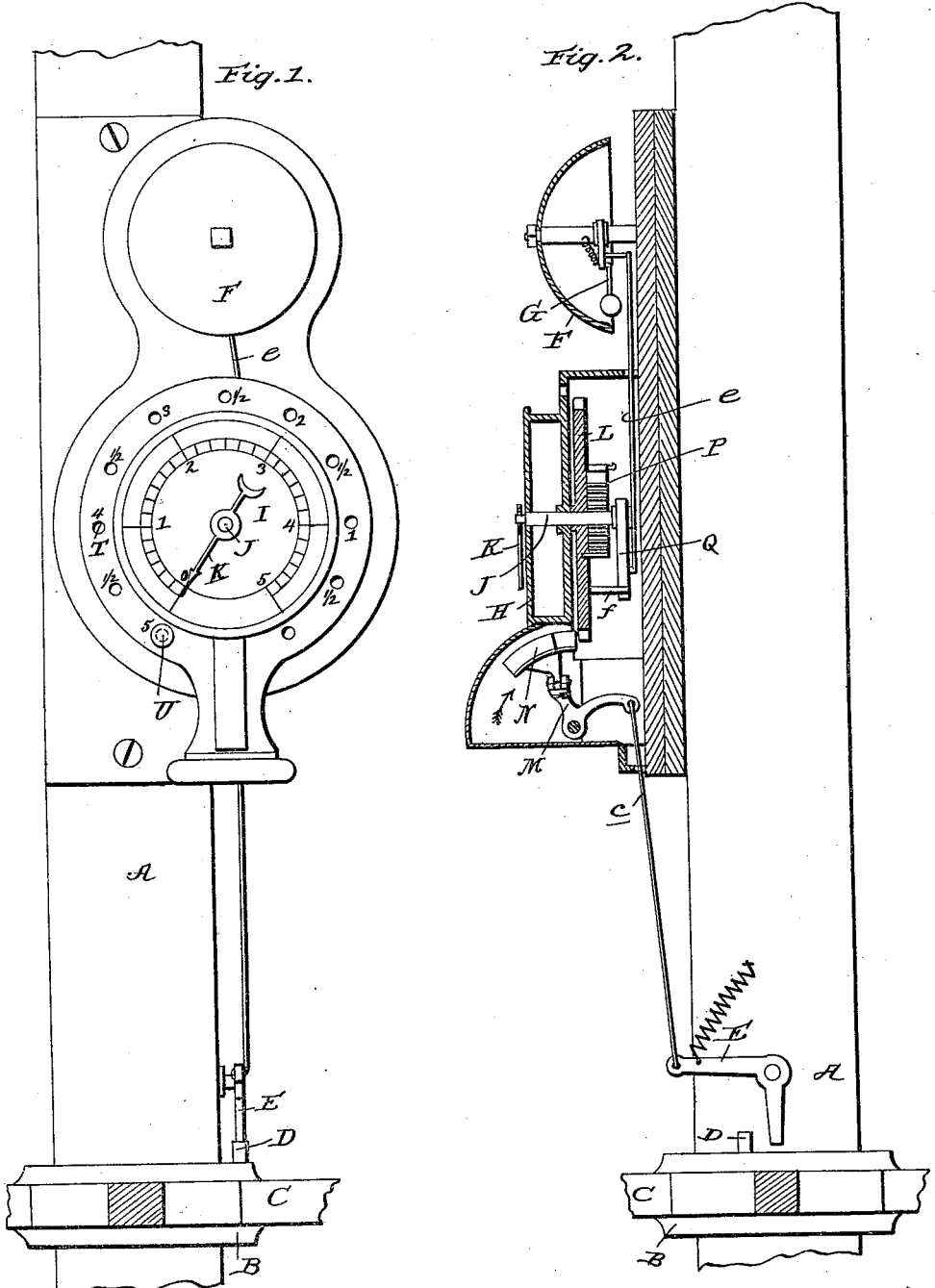

United States Patent Office.

CHARLES R. DAELLENBACH, OF ELLWOOD CITY, PENNSYLVANIA.

INDICATING-ALARM FOR ROUNDABOUTS.

SPECIFICATION forming part of Letters Patent No. 547,143, dated October 1, 1895.

Application filed July 22, 1895. Serial No. 556,811. (No model.)

*To all whom it may concern:*

Be it known that I, CHARLES R. DAELLENBACH, a citizen of the United States, residing at Ellwood City, in the county of Lawrence and State of Pennsylvania, have invented certain new and useful Improvements in Indicators; and I do declare the following to be a full, clear, and exact description of the invention, such as will enable others skilled in the art to which it appertains to make and use the same.

My invention relates to improvements in indicators; and it has for its general object to provide a cheap and simple indicator adapted to indicate the number of revolutions made by roundabouts and the like, and one adapted to ring a bell when the roundabout has made a certain predetermined number of revolutions.

Other objects and advantages of the invention will be fully understood from the following description and claims, when taken in connection with the annexed drawings, in which—

Figure 1 is an elevation of my improved indicator in position on the center-post of a roundabout. Fig. 2 is a view taken at right angles to Fig. 1, with parts in section. Fig. 3 is an enlarged detail section of the indicator. Fig. 4 is a section taken in the plane indicated by the line $x\ x$ of Fig. 3. Fig. 5 is a detail elevation illustrating the toothed wheel, the beveled segment for moving the same, the ratchet-spring for preventing retrograde movement of the toothed wheel, and the keeper-spring for engaging and holding the ratchet-spring out of engagement with the wheel. Figs. 6, 7, and 8 are detail views which will hereinafter be referred to.

In the said drawings similar letters designate corresponding parts in all of the views.

A indicates the center-post or axle of a roundabout.

B indicates the hub, which carries the usual radial arms C and is provided with a tappet D for a purpose presently described.

E indicates a bell-crank lever, which is fulcrumed on the post A and is designed and adapted to be engaged by the tappet D, and is also designed to be returned to its normal position, together with the parts that are connected with it, by the coiled spring $E^3$.

F indicates a bell, which is mounted on the post and is provided with a hammer G, which may be of the ordinary or any appropriate construction, and H indicates the casing of the indicating mechanism, which is mounted on the post A, preferably between the bell F and the hub B of the roundabout, as shown. This casing H is provided with a suitable dial I, and in it is journaled the shaft J, upon which is fixed the indicator-hand K and the wheel L. The said wheel L is provided with a plurality of small teeth $a$ and a single large tooth $b$, and is rotated step by step by the tappet D on the rotary hub B, through the medium of the lever E, the bell-crank lever M, which is connected with the lever E by a rod $c$, and the beveled segment N, which is connected in a hinged manner to one end of the lever M, as better shown in Fig. 8, so as to enable it to swing laterally in the direction in which wheel L moves only, and is designed, when said lever is rocked, to move in a direction at right angles to the wheel L, between the teeth $a$ thereof, and by bearing against said teeth move the wheel the distance of one tooth.

When the wheel L is moved in the direction opposite to that indicated by arrow in Fig. 3 by the movement of the beveled segment N in a direction at right angles to the wheel, it will be seen that it is necessary for the said segment, which rests in an interdental space between two teeth of the wheel, to move or swing laterally with the wheel the distance of one tooth. The construction shown in Fig. 8 permits the segment to thus move or swing with the wheel L, and also enables the segment when it moves back in a direction opposite to that indicated by arrow in Fig. 2 and out of engagement with the teeth of the wheel to resume the position shown in Fig. 8 with respect to the lever M, so that when it is again moved forward in the direction indicated by arrow in Fig. 2 it will enter the interdental space immediately in rear of that which it formerly entered.

P indicates a spring which has one end connected to the casing H and its opposite end connected to the shaft J, and is designed to return the wheel L to the starting-point of its movements when said wheel is released, as presently described.

Q indicates an arm which is loosely mounted upon the shaft J and is connected with the hammer G of bell F by a cord e or other suitable connection, and is designed to be engaged by the stud f on the wheel L.

R indicates the ratchet-spring which is connected to the casing H and is designed to engage the teeth a of wheel L, so as to hold said wheel against retrograde movement, and is provided with a lateral extension g, for a purpose presently described, and S indicates the keeper-spring which is connected to the casing H and rests in a position approximately at right angles to the spring R, as shown. This spring S is bent, as better shown in Fig. 7, to form the shoulder h, which is designed to retain the spring R out of engagement with the wheel L, the upwardly-extending branch i, which is adapted to bear against the extension g of spring R when said spring R is in engagement with the teeth h of wheel L, and the horizontal portion j, which has its end beveled, as indicated by k, and is designed to be engaged by the beveled segment N to release the spring R from engagement with the shoulder h, as will be hereinafter more fully described.

T indicates a circular series of holes which are formed in the face of the casing H, and are designed to receive the pin U, against which the large tooth b of the wheel L is designed to strike when turned in the direction indicated by arrow (see Fig. 3) by the spring P.

The dial I of my improved indicator may be divided or graduated in any suitable manner; but, as I have found from experience that roundabouts make about six revolutions in a minute, I prefer to divide the dial into five divisions numbered from one to five, as shown, and to subdivide such divisions into six subdivisions. With such a dial on the indicator, if it is desired to run the roundabout five minutes before the bell F rings, the pin U is placed in the aperture T which is numbered "5," so that the large tooth b of the wheel L will start to move in a direction opposite to that indicated by arrow from such point. When the tooth b rests against the pin U, as described, the spring R will be held away from the teeth of wheel L by the shoulder h of spring S engaging the extension g of said spring R. Now when the roundabout is set in motion the tappet D will engage the lever E, and through the medium of the said lever the connection c and the lever M will move the beveled segment N in the direction of the arrow, (see Fig. 2,) so as to move the wheel L the distance of one tooth, which will be indicated by the consequent movement of the indicator-hand K. As the segment N moves, as stated, it will engage the beveled end k of the spring S, and will move said spring in the direction indicated by arrow in Fig. 5, so as to release the spring R and enable the same to spring upwardly against the wheel, so as to hold it against retrograde movement in the direction indicated by arrow in Fig. 3, and also by bearing against the extension i of spring S to hold said spring out of the path of the segment N. The continued rotation of the roundabout-hub B and the consequent reciprocatory movement of the segment N will move the wheel L in a direction opposite to that indicated by arrow in Fig. 3, and each rotation will be indicated by the movement of the hand K the distance of one subdivision of the dial. When the wheel L has moved sufficiently far, the stud f thereon will engage and move the arm Q, and through the medium of the same and the hammer G will ring the bell F. Simultaneously with the ringing of the bell F the large tooth b of the wheel will engage the spring R and will depress the same, so as to enable the spring S to move in the direction opposite to that indicated by arrow in Fig. 5, and through the medium of its shoulder h hold the spring R out of engagement with the wheel. When this is done, the spring P will move the wheel in the direction indicated by arrow in Fig. 3 until the large tooth b of the wheel engages the pin U, as before described. The bell F may be made to ring after the roundabout has made any desired number of revolutions by changing the position of the pin U, as is obvious.

It will be seen from the foregoing that, while very cheap and simple, my improved indicator is very efficient for the purposes stated and will correctly indicate the number of revolutions made by the roundabout when the bell rings.

I have in some respects specifically described the construction and relative arrangement of the parts of my improved indicator in order to impart a full, clear, and exact understanding of the same; but I do not desire to be understood as confining myself to such construction and arrangement, as such changes or modifications may be made in practice as fairly fall within the scope of my invention.

I also do not desire to be understood as confining myself to the use of my improved indicator in conjunction with a roundabout, as it may be used to advantage in various connections.

Having described my invention, what I claim is—

1. In an indicator, the combination of a casing, a shaft journaled in the casing, an indicator hand fixed on said shaft, a wheel also fixed on the shaft and having a plurality of small teeth and a single large tooth or projection, a ratchet spring adapted to engage the small teeth of the wheel so as to hold it against retrograde movement and having an extension g, a keeper spring having a shoulder h, and an extension i, adapted to alternately engage the extension g, of the ratchet spring and also having the beveled end k, the reciprocatory beveled segment disposed at right angles to the wheel and adapted to engage the teeth of the wheel so as to move it in one direction and also adapted to engage the beveled end of the keeper spring, and a suitable means for moving the wheel in the opposite direction when it is released from the ratchet spring, substantially as specified.

2. In an indicator, the combination of a casing having a circular series of apertures T, a pin U, adapted to be arranged in the apertures T, a shaft journaled in the casing, an indicator hand fixed on said shaft, a wheel also fixed on the shaft and having a plurality of small teeth and a single large tooth or projection, a ratchet spring adapted to engage the small teeth of the wheel so as to hold it against retrograde movement and having an extension $g$, a keeper spring having a shoulder $h$, and an extension $i$, adapted to alternately engage the extension $g$, of the ratchet spring and also having the beveled end $k$, the reciprocatory beveled segment disposed at right angles to the wheel and adapted to engage the teeth of the wheel so as to move it in one direction and also adapted to engage the beveled end of the keeper spring and a suitable means for moving the wheel in the opposite direction when it is released from the ratchet spring, substantially as specified.

3. In an indicator, the combination of a casing, a shaft journaled in the casing, an indicator hand fixed on said shaft, a wheel also fixed on the shaft and having a plurality of small teeth and a single large tooth or projection, a ratchet spring adapted to engage the small teeth of the wheel so as to hold it against retrograde movement and also adapted to be engaged by the large tooth or projection, a keeper spring adapted to engage the ratchet and hold the same after it is engaged by the large tooth or projection, a device adapted to engage the small teeth of the wheel to move the same in one direction and also adapted to move the keeper spring so as to release the ratchet spring and a suitable means for moving the wheel in the opposite direction when it is released from the ratchet spring, substantially as specified.

4. In an indicator, the combination of the center post or axle of a roundabout or the like, a rotary hub arranged thereon and provided with a tappet, a bell crank lever fulcrumed on the center post and adapted to be engaged by the tappet, a casing connected to the center post, a shaft journaled in said casing and carrying a toothed wheel and an indicator hand, mechanism connected with the bell crank lever for rotating the toothed wheel and shank; a bell also connected with the center post and having a hammer and mechanism connected with the shaft for actuating said hammer, substantially as and for the purpose set forth.

5. In an indicator, the combination of a casing, a shaft journaled in the casing, an indicator hand, fixed on said shaft, a wheel also fixed on the shaft and having a plurality of small teeth and a single large tooth or projection, a ratchet spring adapted to engage the small teeth of the wheel so as to hold it against retrograde movement and having an extension $g$, a keeper spring having a shoulder $h$, and an extension $i$, adapted to alternately engage the extension $g$, of the ratchet spring and also having the beveled end $k$, the reciprocatory beveled segment disposed at right angles to the wheel and adapted to engage the teeth of the wheel so as to move it in one direction and also adapted to engage the beveled end of the keeper spring, a suitable means for moving the wheel in the opposite direction when it is released from the ratchet spring, an arm loosely mounted on the shaft and adapted to be engaged by a stud or projection on the toothed wheel, a bell having a hammer, and a connection between the said arm and the bell hammer, substantially as and for the purpose set forth.

In testimony whereof I affix my signature in presence of two witnesses.

CHARLES R. DAELLENBACH.

Witnesses:
J. C. CUNNINGHAM,
FRANK A. BLACKSTONE.